3,682,660
PROCESS FOR THE PASTEURIZATION OF EGG WHITES

Willibald F. Kohl, Nanuet, and John C. Sourby, Mount Kisco, N.Y., and Rudolph H. Ellinger, Chagrin Falls, Ohio, assignors to Stauffer Chemical Company, New York, N.Y.
No Drawing. Continuation-in-part of application Ser. No. 694,808, Jan. 2, 1968. This application May 25, 1970, Ser. No. 40,450
Int. Cl. A23b 5/00; A23l 3/00
U.S. Cl. 99—161                                      9 Claims

ABSTRACT OF THE DISCLOSURE

A process for pasteurizing egg whites which consists of separating the egg whites from the egg yolks in the conventional manner. Thereafter, an effective amount of an alkali polyphosphate material is added to the egg whites along with a sufficient amount of food grade acid to adjust the pH thereof to between 6.5 and 8.0. The egg whites are then heated to a pasteurization temperature of 130° F. to 145° F. for a period of from 0.5 to 10 minutes.

RELATED APPLICATION

This application is a continuation-in-part of application Ser. No. 694,808, filed Jan. 2, 1968, now abandoned.

BACKGROUND OF THE INVENTION

There are a number of food poisoning microorganisms that cause serious problems in the food industry. Among these different spoilage organisms which may contaminate foodstuff, the group Salmonellae have gained special importance. Salmonellae are pathogenic gram-negative rod-like bacteria that have drawn much recent attention that is well documented in the literature. Of the several food areas involved, particular interest has been generated in the reduction of Salmonellae in egg products. The contents of an egg with unbroken shell may already contain bacteria caused by the infection of a laying hen. The exterior surface of the egg may be contaminated with bacteria from the intestinal tract of the hen, from the nest or from other material contacted after laying. Some of these can be introduced into egg products during breaking operations. Bacteria can also penetrate the shell from outside. The invading microorganisms infect the egg and can be carried on into a variety of egg products.

The elimination of Salmonellae by pasteurization of egg products has become mandatory under United States Department of Agriculture regulations. According to these regulations all egg products have to be pasteurized regardless of whether they are to be distributed in frozen, liquid or dried form.

There are problems in pasteurization that are peculiar to egg whites as compared to whole eggs or yolks. All pasteurizataion processes for egg whites must be a compromise between the amount of heat applied to kill Salmonellae and the coagulation of the egg proteins, which affect the functional properties thereof. Although naturally occurring levels of Salmonellae are seldom greater than 100 per milliliter of egg product, present processes have need of improvement to minimize undesirable effects on functional properties or excessive buildup on plant equipment. Present processes also lack retained inhibitory effects after pasteurization.

At present, there exist several processes which give acceptable destruction of Salmonellae in egg whites. One of these processes is described and claimed in U.S. Pat. No. 3,251,697, which involves the addition of a food grade acid to lower the pH of the egg whites from about 9.0 to about 7.0, and with the addition of aluminum or other metal ions to stabilize the egg proteins against coagulation at higher temperatures. These materials may be added to give a concentration of 30 parts per million as aluminum, added in the form of aluminum sulfate and 0.15% lactic acid in the egg whites. The egg whites may then be pasteurized at a temperature of 140 to 143° F., at a holding time of 3.5 minutes. This procedure is reported to destroy one million added Salmonellae per milliliter. However, it has been found in practice that the bacterial count in this process is relatively high after treatment. Also, the aluminum sulfate in the egg whites will cause the appearance of small particles of precipitated egg proteins.

Another proposed solution to killing the bacteria within the egg whites is described and claimed in U.S. Pat. No. 2,776,214. This process involves taking the egg white at its normal pH, heating it to 100° to 130° F. for a period of 0.5 to 5 minutes. This is claimed to largely inactivate the indigenous catalase. Thereafter, sufficient hydrogen peroxide solution is metered in to give a concentration of 0.1% peroxide in the egg whites. The egg whites are then reheated and then they are cooled and catalase is added to destroy the residual peroxide. This process is reported to produce sterile egg white. This process has a serious drawback because a relatively high amount of bacteria may survive the pasteurization process when heat resistant bacteria strains are present in the egg whites.

BRIEF DESCRIPTION OF THE INVENTION

It has been discovered that egg whites can be readily pasteurized and the bacteria count can be materially reduced by incorporating within the egg whites prior to pasteurization from about 0.20 to about 2.0% of an alkali polyphosphate having from 2 to 40 units and a food grade acid to adjust the pH to between about 6.5 and about 8.0. Thereafter, the egg whites are heated to a temperature of between about 130° F. to about 145° F. to pasteurize the egg whites. This combination of additive with heat has sufficient power to materially reduce the number of Salmonellae within egg whites. Without the addition of the polyphosphate to the egg white, the egg whites will coagulate, and become unacceptable when subjected to the pasteurization conditions described above. It has also been discovered that the preferred sequence of process steps comprises adjustment of pH to between about 6.5 and about 8.0 prior to addition of the alkali polyphosphate. It has been found that the introduction of additives prior to pH adjustment tends to create conditions which could denature the egg whites, and thereby adversely affect their function or performance, although a satisfactory performance may still be achieved. It has further been found that readjustment of pH after pasteurization to a level which is the same as or higher than the original pH of the egg whites improves residual kill of bacteria.

DETAILED DESCRIPTION OF THE INVENTION

In the practice of the present invention, egg whites are first produced in a conventional manner. From 0.20 to about 2.0% by weight of an alkali polyphosphate having from about 2 to 40 units is dissolved therein. Specific polyphosphates that can be used with the present invention are sodium tripolyphosphate, tetrasodium pyrophosphate, tetrapolyyphosphate, sodium hexametaphosphate, sodium acid pyrophosphate and mixtures thereof.

A food grade acid is added to the egg whites, preferably prior to addition of alkali polyphosphate, although addition prior to pH adjustment is an alternative embodiment. The food grade acids usable with the present invention may include orthophosphoric acid, hydrochloric acid, latic acid, citric acid, acetic acid, tartaric acid, pyrophosphoric acid and the like. The amount of acid that is incorporated into the egg white may range up to a sufficient amount of acid to adjust the pH to between 6.5 and 8.0. As is apparent, the function of the acid is to adjust the pH of the resultant mixture.

After adjustment of pH and addition of alkali polyphosphate, the egg whites are heated to a temperature of 130° F. to 145° F., preferably between 140 and 143° F., for a period of from 0.5 to 10 minutes holding time, preferably about 3½ minutes. The egg whites are then cooled and the pH thereof is adjusted to the original level or higher. The pH is preferably adjusted to above about 8 up to about 10 and most preferably to between about 9 and about 10.

It has been found in practice that by treating the egg whites with the above noted additives, the number of Salmonellae killed during pasteurization is materially increased.

In order to illustrate the merits of the invention, the following examples are provided:

EXAMPLE 1

Egg whites were obtained in a hand operation by separating the same from the yolks and mixed to form a uniform batch. A bacterial culture of Salmonellae typhimurium was addede to the egg whites to provide a concentration thereof of 80,000 per milliliter. Then, 0.35% by weight of sodium tripolyphosphate was added to the egg whites. Thereafter, a 10% solution of orthophosphoric acid was added dropwise to lower the pH of the egg whites to 7.0. The egg whites were then subjected to pasteurization temperature of 142° F. for a holding time of 3.5 minutes. The egg whites were then cooled to 40° F. An assay of the egg whites for Salmonellae using standard microbiological procedures indicated that the samples were Salmonellae negative.

EXAMPLE 2

In order to compare the results obtained in Example 1, a control experiment was conducted by adding to the egg whites a concentration of 80,000 per milliliter Salmonellae typhimurium. Then, 0.6% by weight stabilizer solution was added thereto. The stabilizer solution was obtained by dissolving 60 grams of hydrated aluminum sulfate in 1 liter of 25% lactic acid. The pH of the egg whites was 7.0. After subjecting the egg whites to the identical pasteurization temperatures as set forth in Example 1, an assay of the egg whites using standard microbiological procedures indicated a survival of 52 Salmonellae per milliliter.

EXAMPLE 3

Egg whites were obtained in the same manner as set forth in Example 1. Then, a bacterial culture of Salmonellae senftenberg 775W was added to give a concentration thereof of 200,000 per milliliter. Thereafter, 0.75% by weight sodium tripolyphosphate was added to the egg whites. Then, a 10% solution of hydrochloric acid was added dropwise until the pH of the egg whites was 7.0. The egg whites were then subjected to a pasteurization temperature of 142° F. for a holding time of 3.5 minutes. The egg whites were then quickly cooled to 40° F. A standard microbiological assay of the pasteurized egg whites reveal that the samples were Salmonellae negative.

EXAMPLE 4

The additives as set for in Example 2 were added to egg whites having 200,000 Salmonellae senftenberg 775W per milliliter. The egg whites were then subjected to the same pasteurization conditions as set forth in Example 2. A standard microbiological assay of these pasteurized eggs indicated an average number of 4 Salmonellae senftenberg 775W per milliliter egg whites survived the pasteurization conditions.

EXAMPLE 5

The pasteurized egg whites of Example 3 were tested for any indication of an alteration of the functional properties thereof. Accordingly, 176 grams of the egg whites were mixed with a kitchen style mixer for 90 seconds. The amount of foam thus generated was then measured. The quantity of foam produced is a measure of the degree of protein denaturation that may occur during pasteurization. The amount of foam produced by the egg whites in 90 seconds is inversely proportional to the amount of protein denatured during pasteurization. The volume of foam produced under these conditions is reported as specific volume determined by dividing the total amount of foam generated in milliliters, by the weight of the egg whites in grams. Thus, a specific volume of less than 3 indicates an excessive denaturation of the egg whites which is undesirable. The egg whites treated as set forth above had a specific volume of over six. After the specific volume of the egg whites had been measured, the baking performance thereof was measured by preparing angel food cakes from the pasteurized egg whites. Thus, the 176 grams of egg whites were beat for an additional two minutes with the kitchen style mixer. Thereafter, 2.45 grams of cream of tartar, 0.70 grams of salt, and 84.0 grams of sugar were added. The mixer was then blended for an additional two minutes. Then a blend consisting of 42 grams of flour and 45 grams of sugar was folded into the whipped egg whites. The resulting batter was placed in six inch pans and baked for thirty minutes at 355° F. After baking, the volume of the cakes were measured by standard seed displacement techniques. The specific volumes were determined by dividing the weight of the cakes in grams into the total volume. A specific volume greater than 3 is indicative of acceptable egg white functional properties. In this instance, the specific volume was 4.4. Any changes in opacity of the egg whites due to pasteurization was measured by visual observation. An increase in opacity or the formation of solid protein particles is indicative of protein denaturation. The egg whites pasteurized in accordance with this invention were clear.

EXAMPLE 6

The pasteurized egg whites of Example 1 were tested for any alteration of the functional properties in the same manner as set forth in Example 5. The specific volume of the foam after whipping of the pasteurized egg whites was 5.5. The pasteurized egg whites had no coagulation and were clear in appearance. The foaming properties of the pasteurized egg whites clearly indicated the stabilization of the proteins of the egg whites against coagulation.

EXAMPLE 7

The procedure of Example 1 was repeated in its entirety except no additives were incorporated within the egg whites. Then, the egg whites were treated as in Example 5. The specific volume was 2.0.

EXAMPLE 8

A batch of egg whites of pH 9.0 was inoculated with three strains of Salmonellae, namely Salmonella derby, Salmonella oranienburg, and Salmonella typhimurium to a total concentration of 120,000 per ml. The pH of these egg whites was lowered by adding 15% lactic acid to pH 6.5. Then an amount of 25 ml. of a 50% solution of food grade sodium hexametaphosphate was added to 1 liter of egg whites. The thus treated and supplemented egg whites were pasteurized by heating them to 136° F., with 3.5 minutes holding at this temperature, followed by rapid cooling. Salmonella testing of pasteurized egg whites was negative. This result indicated that all Salmonellae had been killed in the process. The pH of the egg whites was readjusted to an alkaline value of pH 9.7 by dropwise addition of 10% NaOH. These egg whites were then stored at refrigerated temperature of 42° F. After 1 day of storage, the egg whites were recontaminated with bacteria. Amounts of 1000 per ml. each of Salmonella typhimurium, Staphylococcus aureus, and Escherichia coli were introduced into the egg whites. Total plate counts were determined daily for the following 14 days. These total plate counts indicated a steady decrease in the surviving number of bacteria in the egg whites.

The performance of egg whites prepared in accordance with Example 8 was compared with the performance of egg whites prepared in a manner like that specified in Examples 1 and 3. The performance tests are as specified in Example 5. It was found that egg whites treated in accordance with procedures specified in Example 8 gave cakes of greater specific volumes than egg whites prepared according to Examples 1 or 3. Thus, it is preferred to adjust pH prior to incorporation of alkali polyphosphate in the pasteurization process of this invention.

What is claimed is:

1. A process for pasteurizing egg whites which comprises:
    (a) preparing egg whites containing from about 0.20 to about 2.0 percent by weight of a food grade alkali polyphosphate having a chain length between 2 and 40 units dissolved in the egg white and at a pH in the range of between about 6.5 and about 8 the pH is adjusted to the range if necessary, by addition of a food grade acid;
    (b) heating the prepared egg whites to a temperature between about 130° F. to about 145° F. for a sufficient length of time to pasteurize the egg whites.

2. The process as set forth in claim 1, wherein said alkali polyphosphate is selected from the group consisting essentially of sodium tripolyphosphate, tetrasodium pyrophosphate, tetrapolyphosphate, sodium hexametaphosphate, sodium acid pyrophosphate, and mixtures thereof.

3. The process as set forth in claim 1, wherein said food grade acid is selected from the group consisting essentially of orthophosphoric acid, hydrochloric acid, lactic acid, citric acid, acetic acid, tartaric acid, pyrophosphoric acid, and mixtures thereof.

4. The process as set forth in claim 1, wherein the pasteurization temperature is held for a period of between 0.5 and 10 minutes.

5. The process as set forth in claim 1 wherein after pasteurizing the pH of the pasteurized egg whites is adjusted to at least its original value.

6. The process of claim 5, wherein the pH is adjusted to between about 8 and about 10.

7. The process of claim 5, wherein the pH is adjusted to between about 9 and about 10.

8. The process as set forth in claim 1, wherein the pH is adjusted to between about 6.5 and about 8.0 and then said alkali polyphosphate is dissolved in the egg whites.

9. The process as set forth in claim 1, wherein said alkali polyphosphate is dissolved in the egg whites and then the pH is adjusted to between about 6.5 and about 8.0.

References Cited
UNITED STATES PATENTS

| 2,445,879 | 7/1948 | Hall | 99—210 |
| 2,929,715 | 3/1960 | Sutton | 99—14 |
| 3,328,175 | 6/1967 | Cunningham et al. | 99—113 |

MORRIS O. WOLK, Primary Examiner

W. BOVEE, Assistant Examiner

U.S. Cl. X.R.

99—211, 113